A. SCHAFFER.
SLICING MACHINE.
APPLICATION FILED SEPT. 17, 1918.
1,291,178.
Patented Jan. 14, 1919.
3 SHEETS—SHEET 1.
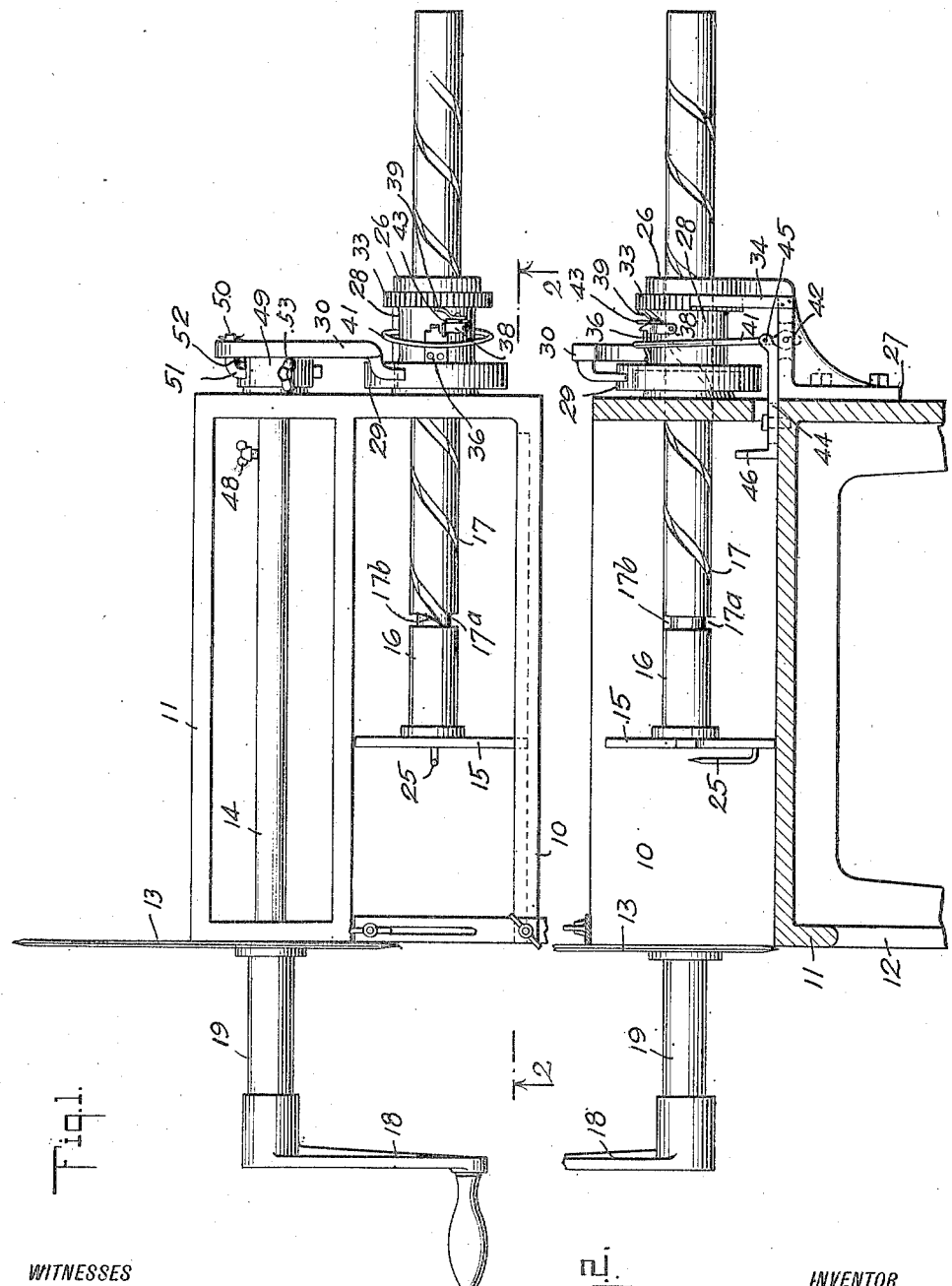
WITNESSES
INVENTOR
Andreas Schaffer
BY
ATTORNEYS A. SCHAFFER.
SLICING MACHINE.
APPLICATION FILED SEPT. 17, 1918.
1,291,178.
Patented Jan. 14, 1919.
3 SHEETS—SHEET 2.
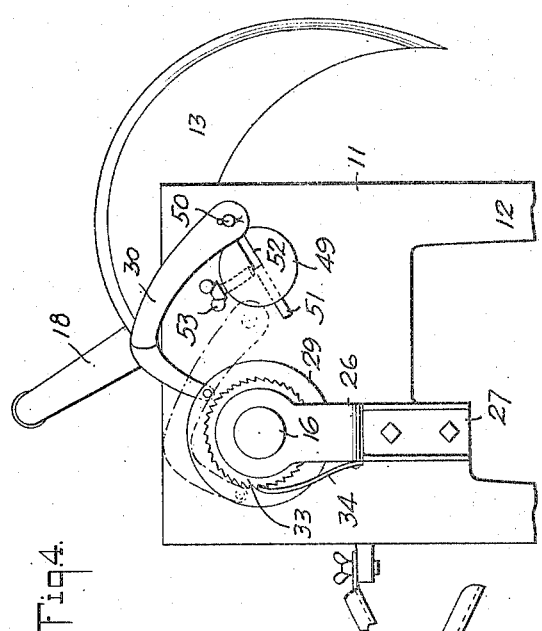
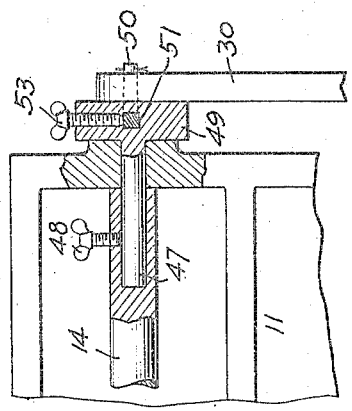
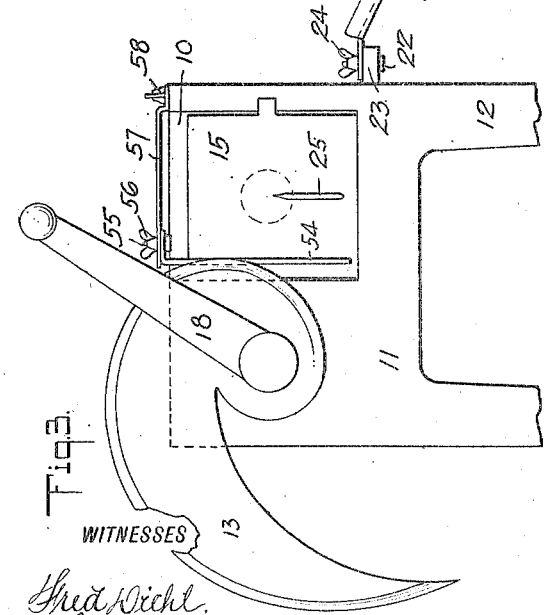
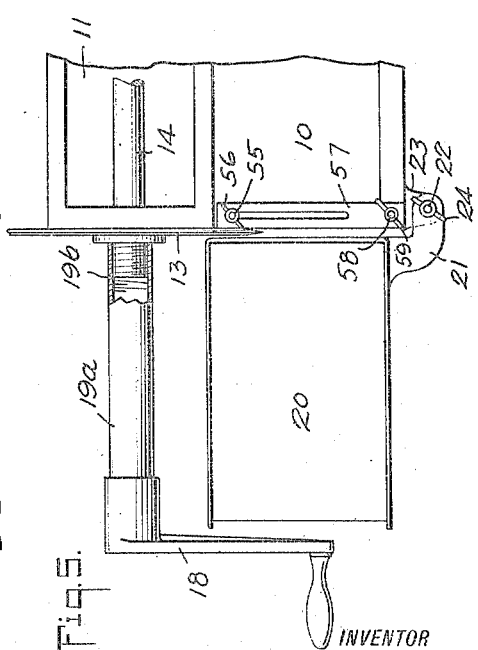
WITNESSES
INVENTOR
Andreas Schaffer
BY
ATTORNEYS

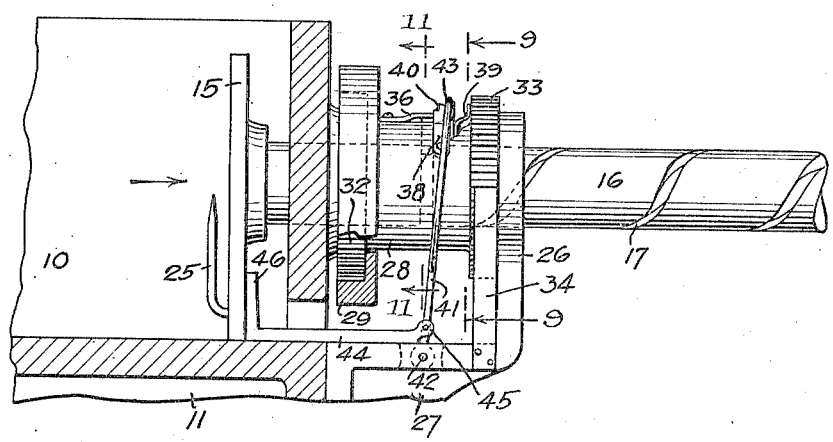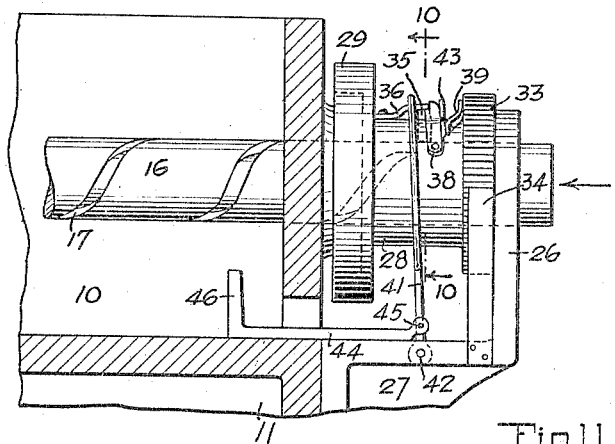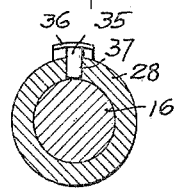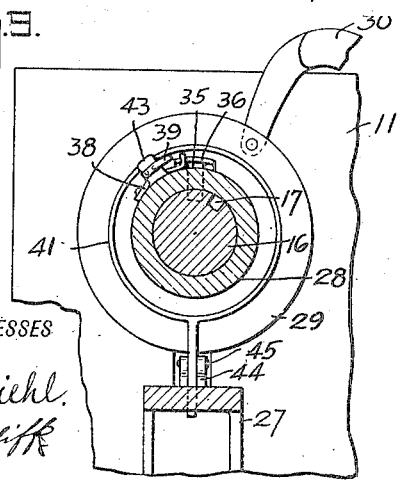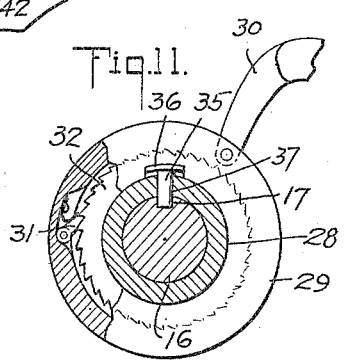

UNITED STATES PATENT OFFICE.

ANDREAS SCHAFFER, OF NEW YORK, N. Y.

SLICING-MACHINE.

1,291,178.  Specification of Letters Patent.  Patented Jan. 14, 1919.

Application filed September 17, 1918. Serial No. 254,470.

*To all whom it may concern:*

Be it known that I, ANDREAS SCHAFFER, a citizen of the United States, and a resident of the city of New York, borough of Manhattan, in the county and State of New York, have invented a new and Improved Slicing-Machine, of which the following is a description.

My invention relates to a combination bread and meat slicing machine of the type in which a receiver is provided having an open front end and a plunger to advance the material through the open front end of the receiver, and a cutter at the front of the receiver, together with a drive shaft carrying the cutter and serving to actuate the plunger by a step-by-step movement.

The general object of the invention is to provide a slicing machine of the indicated character improved in various particulars and possessing distinctive characteristics and advantages among which are the following: In slicing meat the crank handle or equivalent device on the drive shaft for turning the same may be positioned close to the open front end of the receiver, whereas in the case of slicing bread in large quantities as in hotels and restaurants, a tray is provided, pivoted adjacent to the receiver to swing to a side thereof to be out of the way, or swung to the front of the receiver to receive the sliced bread, and an interchangeable means is provided to connect the crank handle a greater or lesser distance from the front of the receiver according to whether the tray is adjusted to receive sliced bread or swung away from the front end of the receiver, so that with the tray in the receiving position the crank handle will clear the tray, and when meat is being sliced the crank handle may be disposed close to the receiver; an upright element is provided at one side of the open end of the receiver and adjustable toward the opposite side of the receiver according to the diameter of the loaf or piece of meat being sliced; a step-by-step feed means provided for the plunger is actuated from the drive shaft and the connection between the drive shaft and the feed means is adjustable to time the feed accurately with the revolutions of the cutter; means is provided to vary the stroke of the actuating means for the step-by-step feed; means is provided to automatically disconnect the feed means from the plunger when the latter reaches the limit of its forward movement and automatically throw the feed means into action when the plunger is returned to the rearward position, the last-mentioned means being controlled by the rearward movement of the plunger.

Reference is to be had to the accompanying drawings forming a part of this specification, it being understood that the drawings are merely illustrative of one example of the invention.

Figure 1 is a plan view of a slicing machine embodying my invention, the swingable tray and the supporting bracket thereof being broken away;

Fig. 2 is a longitudinal vertical section on the line 2—2, Fig. 1;

Fig. 3 is a front end view with the tray swung to a side of the machine;

Fig. 4 is a rear end view, the tray being partly broken away;

Fig. 5 is a plan view of the front portion of the machine with the tray swung to a position in front of the receiver;

Fig. 6 is a partly sectional plan view of a portion of the rear end of the machine, the view being given to show the adjustable rear end or section of the drive shaft to be hereinafter more particularly referred to;

Fig. 7 is a partly sectional side elevation on an enlarged scale of the rear portion of the machine with the plunger in the rearward position and the feed means being in operative position;

Fig. 8 is a view similar to Fig. 7 with the plunger rod in the forward position and the feed means thrown out of action;

Fig. 9 is a cross section on the line 9—9, Fig. 7;

Fig. 10 is a detail in cross section on the line 10—10, Fig. 8, the view being given to show the ungrooved rear end of the plunger rod;

Fig. 11 is a cross section on the line 11—11, Fig. 7.

In carrying out my invention in accordance with the illustrated example, a suitable receiver 10 is provided, formed as part of the general frame structure 11, here shown as supported on legs 2. The receiver is open at the top for the entrance of a piece of meat or loaf of bread to be sliced and the front end is open for the movement of the bread, meat or other material, through said end into the path of a cutter 13 driven preferably directly by a drive shaft 14. In the receiver 10 is a plunger 15 having a plunger rod 16 provided with a spiral groove 17, hereinafter more particularly referred to.

The shaft 14 is turned preferably by a crank handle 18 which is detachably secured to said shaft through the medium of a connecting shaft section 19, Figs. 1 and 2, or 19ª, Fig. 5, said sections being of unequal length to dispose the handle 18 different distances from the front end of the receiver. The longer section 19ª is for use when bread is being sliced in large quantities in which case a tray 20 is employed to receive the sliced bread, said tray being pivoted to swing in line with the receiver 10 as in Fig. 5 or to one side of the receiver as in Figs. 3 and 4. The tray 20 in the example shown has a bracket 21 pivoted by a bolt 22 to an ear 23 on a side of the receiver, said bolt having a wing nut 24 or the like. On the plunger 15 at the front is an upwardly projecting hook 25 on which a piece of meat may be secured.

The plunger 16 is driven from the shaft 14 by a step-by-step movement, the mechanism for the purpose being as follows: The rear end of the plunger rod 16 is slidable and turnable in a bearing in the rear end of the receiver 10 and in a bearing 26 on a bracket 27 secured to the frame 11 at the rear end of the receiver. A sleeve 28 is loose on the plunger rod between the receiver and the bearing 26, and loose on said sleeve is a flanged ring 29 to which is pivotally connected one end of a link or connecting rod 30 which is driven by the shaft 14 in a manner hereinafter explained, whereby a rotary reciprocating movement will be imparted to said sleeve. The interior of the said ring 29 carries a pawl 31 engaging a ratchet 32 on the sleeve 28 to impart a step-by-step movement to the latter. A second ratchet 33 on the sleeve 28 is engaged by a retaining pawl or dog 34 to prevent retrograde movement of the sleeve. A pin 35 carried by a spring 36 pivoted to the exterior of the sleeve 28 extends radially through a hole 37 in the sleeve and is adapted to enter the spiral groove 17 of the plunger rod 16 (see Fig. 11). The rear end of the groove 17 is of decreasing depth and finally vanishes into the lateral surface of the plunger rod, whereby to throw out the pin 35 when the plunger reaches the forward position.

In order to hold the pin 35 in the release position, that is, after being disengaged from the groove 17 of the plunger, a latch 38 is pivoted on the sleeve 28 and is acted on by a spring 39 secured thereto and bearing laterally against the face of the ratchet 33 or other adjacent surface, said latch having a notch 40 to receive the end of the spring 36 carrying said pin. The spring 39 rocks the latch 38 on its pivot to engage the same at its notch 40 with the spring 36 when the pin 35 is forced out of the groove 17 as will be clear from a comparison of Figs. 7 and 8. In order to trip the latch 38 when the plunger 15 reaches its rearward position, I provide a trip 41 pivoted as at 42 to the bracket 27 or other fixed part, whereby to be swung against a flange 43 on the latch to move the latter against the tension of the spring 39 for disengaging the latch from the spring plate 36 and permitting the latter to force the pin 35 into the groove 17. The trip 41 is actuated by the plunger 15 when the latter reaches the rearward position for which purpose an actuating bar 44 is pivoted at its rear end as at 45, to the trip 41 and the front end 46 of said bar is disposed in the path of the plunger 15 to be struck by the latter as the plunger reaches the rearward position.

The connection between the link 30 and shaft 14 is effected as follows: The shaft section 47 is received in a socket in the rear end of the main shaft 14 and is secured in adjusted position by a set screw 48. Said shaft section has a head 49 and a wrist pin 50 receives the link 30, said wrist pin being formed of a bar 51 slidably across the axis of the head 49 and adapted to be secured in adjusted position by a set screw 53. The head 49 is grooved as at 52 to accommodate the movement of the wrist pin 50 in adjusting the bar 51. The pin 50 may thus be positioned a greater or lesser distance from the axis of the drive shaft to vary the amplitude of movement of the ring 29 for varying the step-by-step feed of the plunger according to the thickness of the slices required. On the other hand, the shaft section 47 and its head 49 may be turned relatively to the shaft 14 to adjust the angular position of the wrist pin 15 relatively to that of the crank handle 18 for timing the step by step feed with the turning of the knife 13.

In order to vary the effective width of the open end of the receiver 10 according to the diameter of a loaf of bread or the like being sliced, I provide an upright member 54 at one side of the open end of the receiver and adjustable toward the opposite side of the receiver (see Figs. 3 and 5). Said member 54 in the present example is secured by a bolt 55 and a nut 56 to a slotted bar 57 which is detachably secured to the receiver at the top through the medium of a bolt 58 and nut 59 or equivalent means.

Reverting to the slot 17 it will be observed from Figs. 1 and 2 that at the forward end of said slot there is an annular groove 17ª, from which the spiral groove emanates, the annular groove being for the purpose of receiving the pin 35 irrespective of the angular position of said pin when it is permitted to move radially inward to engage the plunger rod. At the junction of the annular and spiral grooves there is a fixed switch point 17ᵇ on the plunger rod to direct the pin to the spiral groove.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A slicing machine including a receiver for the material to be sliced, said receiver being open at the top and at the front end, a cutter at the open end of the receiver, a drive shaft, a plunger in said receiver and provided with a plunger rod, step-by-step feed means actuated by said shaft to advance the plunger rod, means operable by the rearward movement of the plunger to establish connection between the feed means and the plunger rod, and means to disconnect the feed means and plunger rod when the plunger reaches its forward position.

2. A slicing machine including a cutter, a plunger to advance toward the cutter the material to be sliced, a step-by-step feed means to actuate the plunger, means controlled by the plunger to establish connection between the feed means and the plunger upon the latter reaching the rearward position, and means to automatically disconnect the plunger and feed means when the plunger has reached the forward position.

3. A slicing machine including a receiver having an open front end, a plunger in said receiver for advancing the material to be sliced, said plunger having a plunger rod formed with a spiral groove, an element loose on the plunger rod, step-by-step actuating means for said element, a spring-pressed pin carried by said element and adapted to engage in the groove of the plunger rod, said groove at its rear end being of decreasing depth and vanishing into the lateral surface of said rod, whereby to force said pin from the groove of the rod when the plunger reaches its forward position, latch means to hold the pin in the release position, and means operable by a return of the plunger to the rearward position to trip the latch and permit engagement of the pin in the spiral groove.

4. A slicing machine including a receiver having an open front end, a plunger in said receiver for advancing the material to be sliced, said plunger having a plunger rod formed with a spiral groove, a sleeve loose on the plunger rod, ratchet mechanism to turn said sleeve in one direction step-by-step, a spring-pressed pin carried by said sleeve and adapted to engage in the groove of the plunger rod, a spring-pressed latch on said sleeve to hold the pin in the release position, means swingable independently of the sleeve and adapted to trip the latch and permit the pin to engage in the groove of the rod, and means operable by a movement of the plunger rod to the rearward position to actuate said swingable means.

5. A slicing machine including a receiver for the material to be sliced, a plunger in the receiver to advance the material therein, step-by-step feed means for the plunger, and actuating means for said feed means, said actuating means comprising a drive shaft, an operating link connected with the feed means, and an element adjustable transversely on the drive shaft and pivotally connected with said link.

6. A slicing machine including a receiver for the material to be sliced, said receiver having an open front end, a plunger in the receiver to advance the material therein, a drive shaft mounted at a side of the receiver and parallel with the plunger, a cutter revoluble with said shaft across the front end of the receiver, step-by-step feed means for the plunger and arranged at the rear end thereof, and means to actuate said feed means from said drive shaft, said last-mentioned means including a shaft section on the drive shaft at the rear end and a drive connection between said shaft section and said feed means, said shaft section being turnable relatively to the drive shaft to adjust the position of said drive connection relatively to the position of the cutter whereby to time the cutter and feed means.

7. A slicing machine including a receiver having an open front, a plunger in said receiver for advancing the material to be sliced, said plunger having a plunger rod formed with a spiral groove, a sleeve loose on the plunger rod, ratchet mechanism to turn said sleeve in one direction step by step, a spring-compressed pin carried by said sleeve and adapted for radial movement to engage or disengage the plunger rod, a spring-compressed latch on said sleeve to hold the pin disengaged from the rod, means swingable independently of the sleeve and adapted to trip said latch to permit the pin to move radially inward to engage the rod, and means operable by the movement of the plunger rod to the rearward position to actuate said swingable means, there being an annular groove in the plunger rod intersected by the spiral groove, and a switch point at the junction of the annular and spiral grooves to direct said pin from the former to the latter.

ANDREAS SCHAFFER.